United States Patent
Ulrey et al.

(10) Patent No.: US 10,677,172 B2
(45) Date of Patent: Jun. 9, 2020

(54) METHOD AND SYSTEM FOR ENGINE CONTROL

(71) Applicant: Ford Global Technologies, LLC, Dearborn, MI (US)

(72) Inventors: Joseph Norman Ulrey, Dearborn, MI (US); John Eric Rollinger, Troy, MI (US); Michael Howard Shelby, Plymouth, MI (US); Jianwen James Yi, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 287 days.

(21) Appl. No.: 15/648,787

(22) Filed: Jul. 13, 2017

(65) Prior Publication Data

US 2017/0306858 A1 Oct. 26, 2017

Related U.S. Application Data

(62) Division of application No. 14/245,945, filed on Apr. 4, 2014, now Pat. No. 9,759,135.

(51) Int. Cl.
*B60W 10/06* (2006.01)
*F02D 13/02* (2006.01)
(Continued)

(52) U.S. Cl.
CPC ............ *F02D 13/02* (2013.01); *B60W 10/06* (2013.01); *B60W 10/08* (2013.01); *B60W 20/16* (2016.01);
(Continued)

(58) Field of Classification Search
CPC .......... F02D 13/02; F02D 23/02; F02D 21/04; F02D 2250/24; F02D 41/0055;
(Continued)

(56) References Cited

U.S. PATENT DOCUMENTS 3,614,259 A 10/1971 Neff
4,096,695 A 6/1978 Reams et al.
(Continued)

FOREIGN PATENT DOCUMENTS

EP 0435357 A1 7/1991
EP 1124047 A1 8/2001
(Continued)

OTHER PUBLICATIONS

State Intellectual Property Office of the People's Republic of China, Office Action and Search Report Issued in Application No. 201510158682.3, dated Feb. 2, 2019, 10 pages. (Submitted with Partial Translation).

*Primary Examiner* — David J Hlavka
(74) *Attorney, Agent, or Firm* — Geoffrey Brumbaugh McCoy Russell LLP

(57) ABSTRACT

Methods and systems are provided for using compression heating to heat a cylinder piston before cylinder combustion is resumed. Cylinder heating is achieved using combinations of slow unfueled engine rotation where the engine cylinders are heated via compression stroke heating, and slow compressor rotation where the cylinders are heated via compression heating. One or more intake or exhaust heaters may be concurrently operated to expedite cylinder heating.

12 Claims, 8 Drawing Sheets

(51) Int. Cl.
  *F02N 19/04* (2010.01)
  *B60W 10/08* (2006.01)
  *B60W 30/192* (2012.01)
  *B60W 20/40* (2016.01)
  *B60W 20/16* (2016.01)
  *F02D 21/04* (2006.01)
  *F02D 23/02* (2006.01)
  *F02N 19/00* (2010.01)
  *F02D 41/00* (2006.01)

(52) U.S. Cl.
  CPC .......... *B60W 20/40* (2013.01); *B60W 30/192* (2013.01); *F02D 21/04* (2013.01); *F02D 23/02* (2013.01); *F02N 19/04* (2013.01); *B60W 2710/06* (2013.01); *B60W 2710/0605* (2013.01); *B60W 2710/0616* (2013.01); *B60W 2710/0633* (2013.01); *B60W 2710/0638* (2013.01); *B60W 2710/0644* (2013.01); *B60W 2710/0688* (2013.01); *B60W 2710/0694* (2013.01); *B60Y 2300/434* (2013.01); *B60Y 2300/437* (2013.01); *B60Y 2300/474* (2013.01); *B60Y 2400/435* (2013.01); *B60Y 2400/442* (2013.01); *F02D 41/0002* (2013.01); *F02D 41/0055* (2013.01); *F02D 2250/24* (2013.01); *F02N 19/004* (2013.01); *Y02T 10/54* (2013.01); *Y02T 10/6286* (2013.01); *Y10S 903/902* (2013.01); *Y10T 477/23* (2015.01)

(58) Field of Classification Search
  CPC ... F02D 41/0002; B60W 20/16; B60W 20/40; B60W 30/192; B60W 10/08; B60W 10/06; B60W 2710/0688; B60W 2710/0605; B60W 2710/0694; B60W 2710/0633; B60W 2710/0644; B60W 2710/0638; B60W 2710/0616; B60W 2710/06; F02N 19/04; F02N 19/004; B60Y 2300/474; B60Y 2300/434; B60Y 2400/442; B60Y 2300/437; B60Y 2400/435; Y02T 10/6286; Y02T 10/54; Y10S 903/902; Y10T 477/23
  See application file for complete search history.

(56) References Cited

U.S. PATENT DOCUMENTS

| | | | |
|---|---|---|---|
| 4,351,154 A | 9/1982 | Richter | |
| 4,389,845 A | 6/1983 | Koike | |
| 4,443,153 A | 4/1984 | Dibelius | |
| 4,544,326 A | 10/1985 | Nishiguchi et al. | |
| 4,949,276 A | 8/1990 | Staroselsky et al. | |
| 6,079,210 A | 6/2000 | Pintauro et al. | |
| 6,408,833 B1 | 6/2002 | Faletti | |
| 6,555,927 B1 | 4/2003 | Suzuki et al. | |
| 6,565,479 B2 | 5/2003 | Fattic et al. | |
| 6,681,171 B2 | 1/2004 | Rimnac et al. | |
| 6,725,847 B2 | 4/2004 | Brunemann et al. | |
| 6,983,596 B2 | 1/2006 | Frankenstein et al. | |
| 7,137,253 B2 | 11/2006 | Furman et al. | |
| 7,163,005 B2 | 1/2007 | Tussing et al. | |
| 7,640,744 B2 | 1/2010 | Rollinger et al. | |
| 8,161,746 B2 | 4/2012 | Ulrey et al. | |
| 8,267,069 B2 | 9/2012 | Hsia et al. | |
| 8,286,616 B2 | 10/2012 | Clarke et al. | |
| 8,287,233 B2 | 10/2012 | Chen | |
| 8,333,071 B2 | 12/2012 | Oakley et al. | |
| 8,601,813 B2 | 12/2013 | Shutty et al. | |
| 9,080,506 B2 | 7/2015 | McConville et al. | |
| 9,109,505 B2 * | 8/2015 | Ulrey | F02B 47/08 |
| 9,151,219 B2 | 10/2015 | McConville et al. | |
| 9,174,637 B2 | 11/2015 | Banker et al. | |
| 9,261,051 B2 | 2/2016 | Ulrey et al. | |
| 9,279,374 B2 | 3/2016 | Buckland et al. | |
| 9,303,557 B2 | 4/2016 | Ulrey et al. | |
| 9,309,837 B2 | 4/2016 | Ulrey et al. | |
| 9,346,451 B2 | 5/2016 | Ulrey et al. | |
| 9,347,368 B2 | 5/2016 | Ulrey et al. | |
| 9,416,724 B2 | 8/2016 | Byrd et al. | |
| 9,682,685 B2 | 6/2017 | Ulrey et al. | |
| 2002/0043410 A1 | 4/2002 | Suzuki | |
| 2006/0196182 A1 | 9/2006 | Kimoto et al. | |
| 2007/0255485 A1 | 11/2007 | Kaita | |
| 2008/0163855 A1 | 7/2008 | Matthews et al. | |
| 2009/0056429 A1 | 3/2009 | Avallone et al. | |
| 2009/0071150 A1 | 3/2009 | Joergl et al. | |
| 2009/0271094 A1 | 10/2009 | Stablein et al. | |
| 2011/0023842 A1 | 2/2011 | Kurtz | |
| 2011/0094480 A1 | 4/2011 | Suhocki et al. | |
| 2012/0014812 A1 | 1/2012 | Blaiklock et al. | |
| 2012/0291762 A1 | 11/2012 | Vigild et al. | |
| 2012/0297765 A1 | 11/2012 | Vigild et al. | |
| 2013/0247869 A1 | 9/2013 | Hokuto | |
| 2014/0260241 A1 | 9/2014 | Jankovic et al. | |
| 2015/0000634 A1 | 1/2015 | Martin et al. | |
| 2015/0114339 A1 * | 4/2015 | Sellnau | F02N 19/04 123/294 |
| 2015/0136074 A1 | 5/2015 | Styles et al. | |
| 2015/0139076 A1 | 5/2015 | Keller et al. | |
| 2015/0283990 A1 | 10/2015 | Ulrey et al. | |
| 2015/0369180 A1 | 12/2015 | Leone et al. | |
| 2017/0305411 A1 * | 10/2017 | Leone | B60W 10/06 |

FOREIGN PATENT DOCUMENTS

| | | |
|---|---|---|
| EP | 2317111 A1 | 5/2011 |
| EP | 2426340 A1 | 3/2012 |
| EP | 2562397 A1 | 2/2013 |
| JP | 2001159384 A | 6/2001 |

* cited by examiner

| Mode | Closed AIS | Open EGR | Comp. rotn. | Eng. rotn. | Int. heater | Exh. heater | Open CRV | Valve overlap |
|---|---|---|---|---|---|---|---|---|
| 1 | + | + |   |   |   |   |   |   |
| 2 | + | + |   | + | + |   |   |   |
| 3 | + | + |   | + |   | + |   |   |
| 4 | + | + |   | + | + | + |   |   |
| 5 | + | + | + | + |   |   |   | + |
| 6 | + | + | + | + |   |   | + | + |
| 7 | + | + | + | + | + |   |   | + |
| 8 | + | + | + | + | + |   | + | + |
| 9 | + | + | + | + |   | + |   | + |
| 10 | + | + | + | + |   | + | + | + |
| 11 | + | + | + | + | + | + |   | + |
| 12 | + | + | + |   | + |   | + | + |
| 13 | + | + | + |   |   |   | + | + |
| 14 | + | + | + |   |   | + | + | + |
| 15 | + | + | + |   | + | + |   | + |
| 16 | + | + | + |   | + |   |   | + |
| 17 | + | + | + |   |   | + |   | + |
| 18 | + | + | + |   | + | + |   | + |
| 19 | + | + | + |   | + | + |   | + |
| 20 | + | + | + |   | + | + |   | + |

FIG. 6

METHOD AND SYSTEM FOR ENGINE CONTROL

CROSS REFERENCE TO RELATED APPLICATIONS

The present application is a divisional of U.S. patent application Ser. No. 14/245,945, entitled "METHOD AND SYSTEM FOR ENGINE CONTROL," filed on Apr. 4, 2014. The entire contents of the above-referenced application are hereby incorporated by reference in its entirety for all purposes.

FIELD

The present application relates to methods and systems for controlling engine cranking in a hybrid vehicle system.

BACKGROUND AND SUMMARY

Engines may be configured with direct fuel injectors that inject fuel directly into a combustion cylinder (direct injection), and/or with port fuel injectors that inject fuel into a cylinder port (port fuel injection). Direct injection allows higher fuel efficiency and higher power output to be achieved in addition to better enabling the charge cooling effect of the injected fuel.

Direct injected engines, however, can generate more particulate matter (PM) emissions (or soot) due to diffuse flame propagation wherein fuel may not adequately mix with air prior to combustion. Since direct injection, by nature, is a relatively late fuel injection, there may be insufficient time for mixing of the injected fuel with air in the cylinder. In some operating conditions, the liquid fuel droplet may directly impinge on the combustion surfaces such as piston, head, and cylinder liner. Similarly, the injected fuel does not encounter turbulence when flowing through the valves. Consequently, there may be pockets of rich combustion that may generate soot locally, degrading exhaust emissions. The emissions may be further exacerbated during an engine cold start operation. In particular, until the combustion chamber is fully warmed up, soot is generated due to poor fuel evaporation caused by poor fuel injector spray characteristics at low fuel rail pressure and/or fuel impacting the cold metal surfaces of the combustion chamber.

Engine testing data indicates that PM emissions can be reduced by increasing engine temperature. Thus, an electric engine heater may be included in some engine systems. For example, as shown by Vigild et al. in US 20120291762, an intake heater is operated during DFSO conditions when engine fueling is deactivated. By heating air pumped to engine cylinders, the engine can be sufficiently heated to reduce soot emissions.

However, the inventors have identified potential issues with such an approach. As one example, due to the limited time available prior to an engine start, sufficient heating may not be possible. Likewise, due to the limited power availability on the vehicle, as well as the large engine mass, the available heating may not be sufficient. As such, the power required for sufficient engine heating may be higher, leading to poor fuel economy.

Some of the above issues may be addressed by taking advantage of various combinations of engine compression heating as well as individual cylinder compression stroke heating. One example method includes, while propelling a hybrid vehicle via motor torque, rotating an electrically-actuated intake compressor with an intake throttle closed and an EGR valve open until a piston temperature is higher than a threshold. Another example method includes, while propelling a hybrid vehicle via only motor torque, rotating an engine unfueled via the motor torque at lower than engine cranking speed while operating an exhaust heater coupled to an exhaust catalyst and while holding an EGR valve open and an intake throttle closed to recirculate heated aircharge through the engine. Still other combinations may be used in various heating modes. In this way, cylinder heating may be expedited before an engine is restarted.

As an example, while operating a hybrid vehicle in an electric mode, before an imminent engine start and in response to cylinder piston temperatures being not sufficiently hot, the engine may be slowly cranked, unfueled, via the hybrid vehicle's motor/generator to heat the engine cylinders. In one example, the slow cranking may be initiated at least 2-3 minutes before an engine start. The engine may be rotated slowly at lower than an engine cranking speed, such as at 10-30 rpm. During the slow engine rotation, each cylinder may be sequentially passed through a cylinder compression stroke where heat is transferred from the compressed air to the cylinder walls, head and piston. Even though the absolute amount of heat transferred to the engine may be low, the heat is transferred directly to a location where the heating enables a reduction is soot emissions when engine fueling is resumed. While rotating the engine, an intake throttle may be held closed while an EGR valve is held open so that the heated aircharge is pumped in a loop, further improving cylinder heat transfer. Optionally, one or more of an electric intake heater and an electric exhaust catalyst heater may be concurrently operated to further raise the temperature of the charge being circulated through the engine cylinders. In addition to raising cylinder temperature, the slow engine rotation enables a fuel rail pressure to be raised. Once the cylinder temperatures are sufficiently hot, such as when piston temperature is higher than a threshold, and if engine restart conditions exist, the engine may be rotated faster during cranking and engine fueling may be resumed.

In another example, while operating the hybrid vehicle in the electric mode, in response to a need for cylinder piston heating, an electric motor coupled to an electrically actuated compressor may be operated. During the compressor rotation, heat is generated during the compression of air. While the compressor is rotated, cylinder valve timing may be adjusted to increase valve overlap and improve blow-through of the compressed air through the engine cylinders. This enables heated from the heated aircharge to be transferred to the cylinders during the blow-through. While rotating the compressor, an intake throttle may be held closed while an EGR valve is held open so that the heated aircharge is pumped in a loop, further improving cylinder heat transfer. Optionally, one or more of an electric intake heater and an electric exhaust catalyst heater may be concurrently operated to further raise the temperature of the charge being circulated through the engine cylinders. In some examples, alongside the compressor rotation, a compressor recirculation valve may be opened so that compressor energy can also be used to warm a downstream charge air cooler. Further still, while rotating the compressor, the engine may also be slowly rotated, unfueled, so that the heated air can be uniformly distributed to all the engine cylinders. Once the cylinder piston temperatures are sufficiently hot, if engine restart conditions exist, compressor rotation may be disabled, the engine may be cranked, and engine fueling may be resumed.

In this way, by operating an electrically-actuated intake compressor prior to an engine restart, compressor rotation may be used to compress aircharge, thereby generating heat. By rotating the compressor with a compressor recirculation valve open, heat may be rejected from the compressed air at a downstream charge air cooler. By concurrently opening an EGR valve and closing an intake throttle, the heated aircharge can be looped across the engine. In addition, aircharge heating can be enhanced through the use of an intake or exhaust heater. By additionally or optionally slowly rotating the engine, unfueled, via motor torque, the pumped air can also be flowed through one or more cylinders, thereby warming the cylinders prior to an engine restart. In addition, compression stroke heating may be used to heat the cylinders. By pre-heating the engine, particulate emissions from the engine can be reduced, particularly during an engine cold-start. In addition, fuel pressure can be raised to an optimum value for the start, improving fuel injector spray characteristics during the restart. Overall, cold-start emissions can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a table listing various modes of heating operation of the engine.

DETAILED DESCRIPTION

Figure 1:
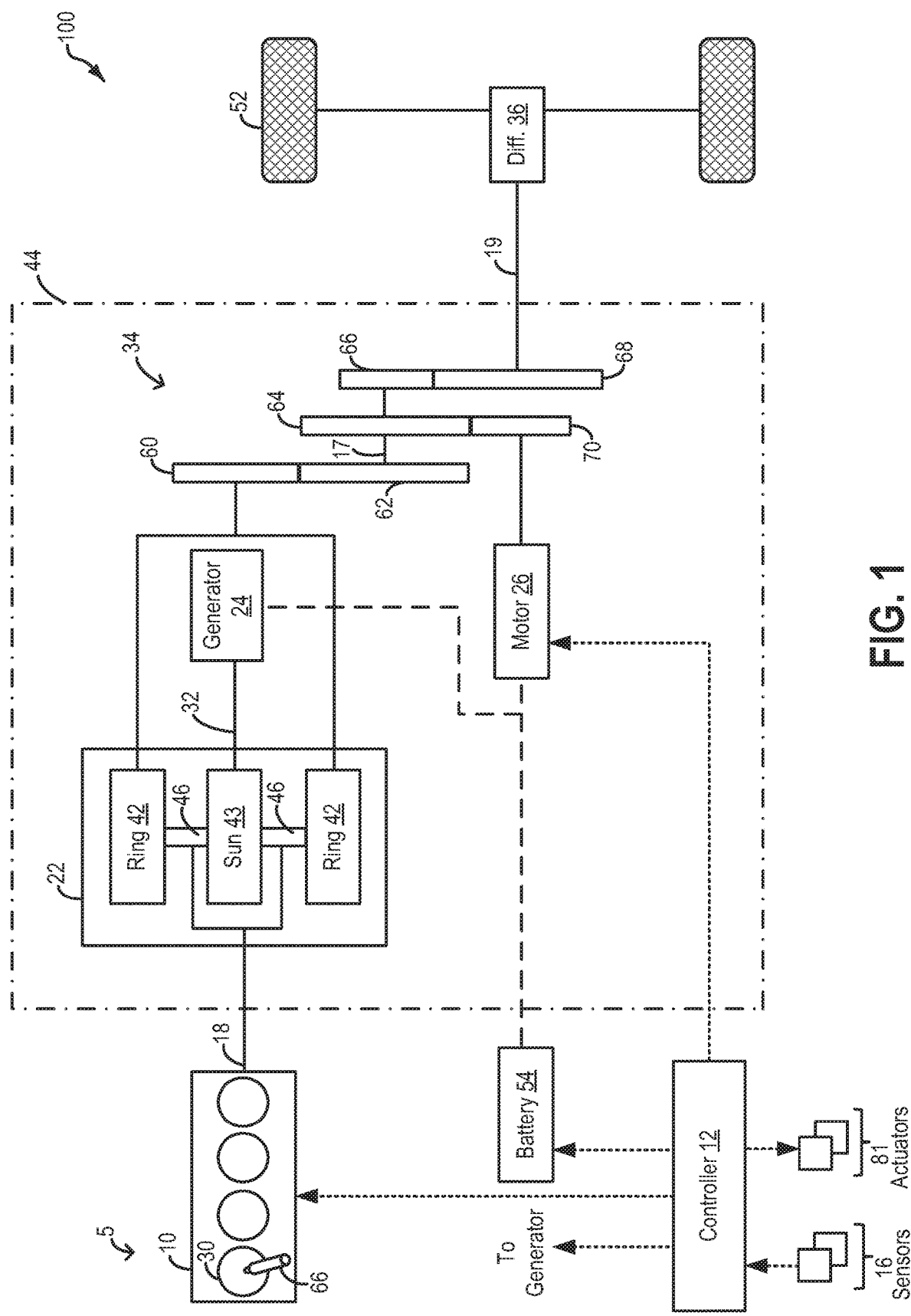
FIG. 1 shows an example hybrid vehicle system layout.
Figure 2:
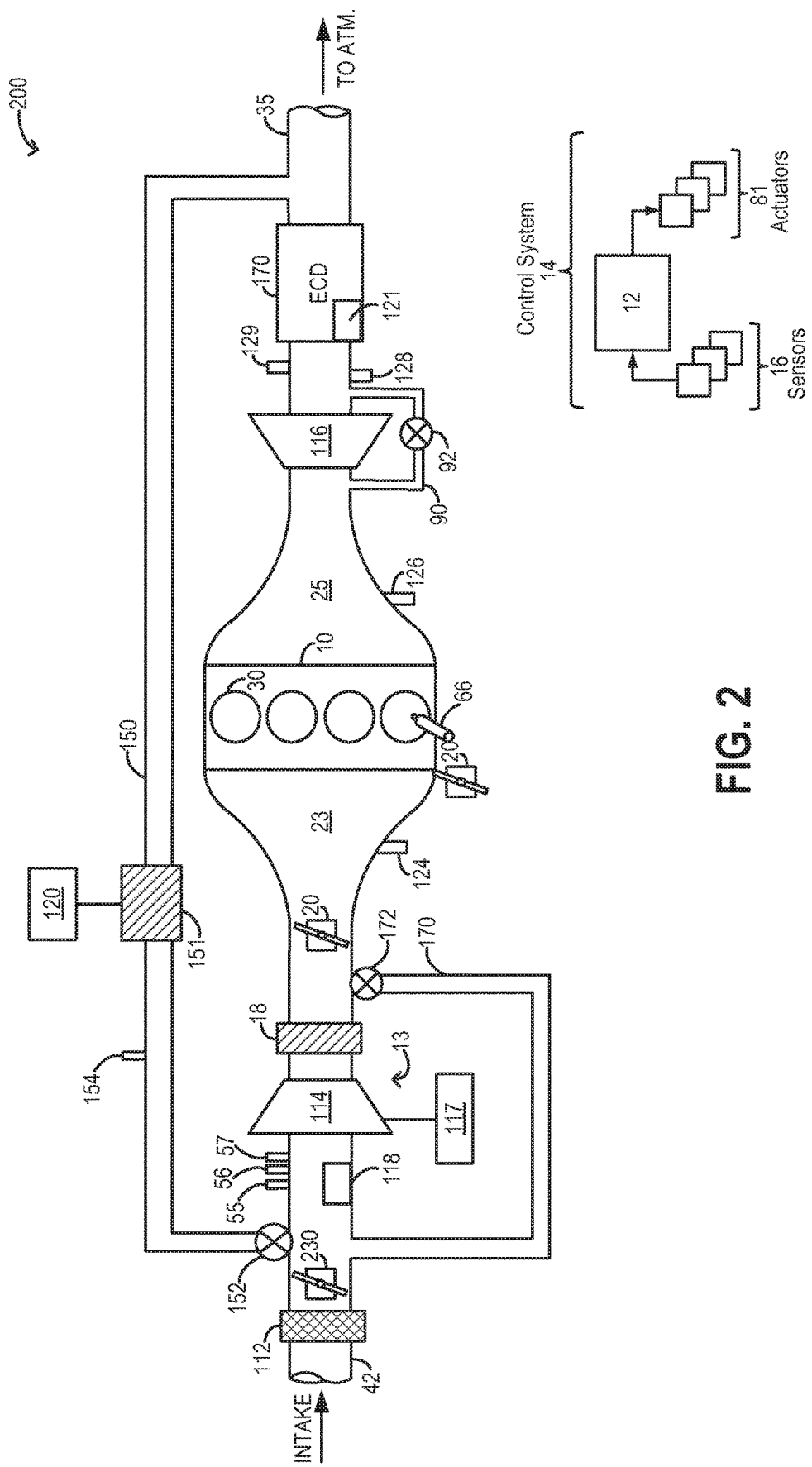
FIG. 2 shows an example engine system layout.
Figure 3:
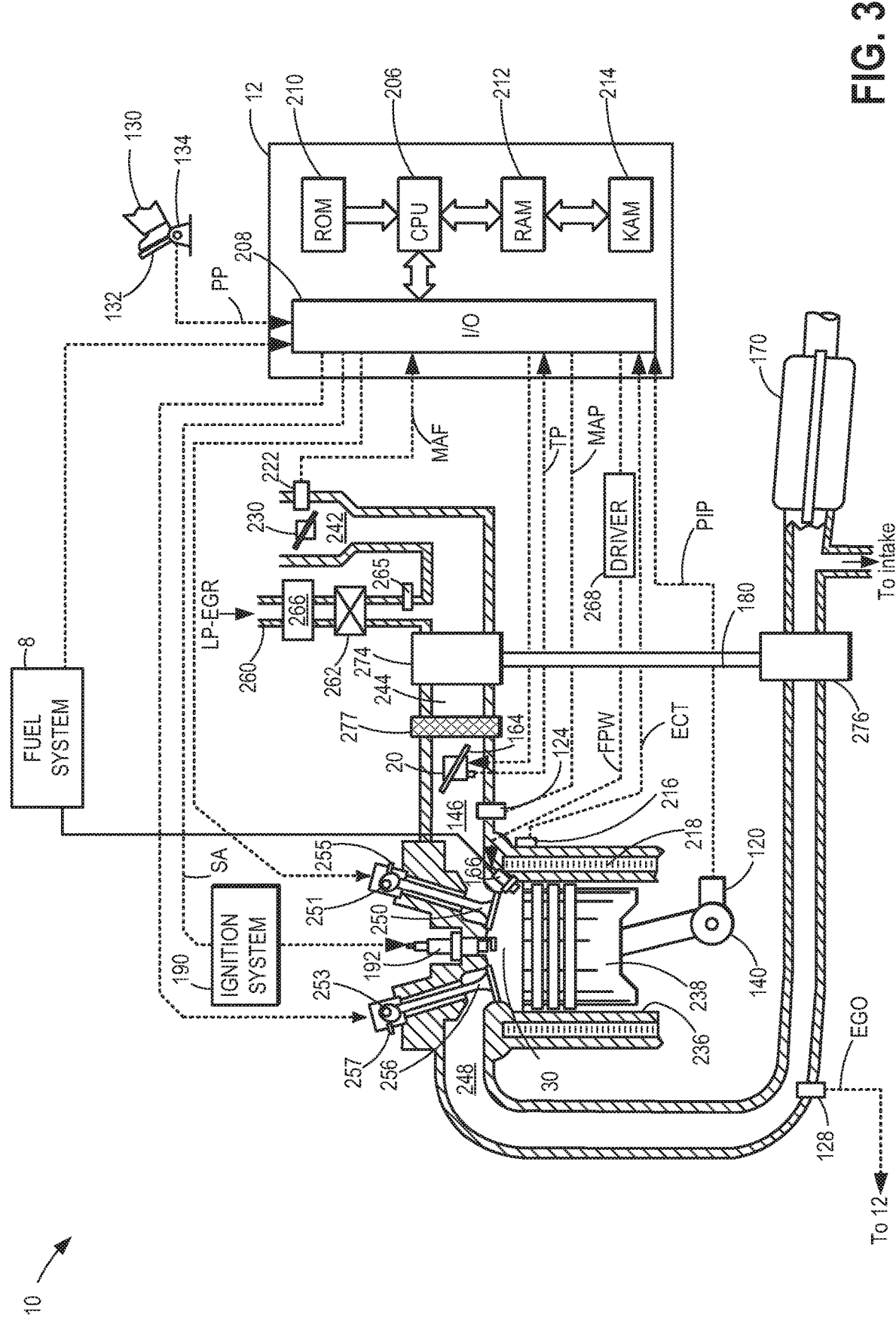
FIG. 3 shows an example combustion chamber.

The following description relates to systems and methods for reducing particulate emissions from an engine, such as the engine system of FIGS. 2-3, coupled in a hybrid vehicle system, such as the plug-in hybrid electric vehicle of FIG. 1. A controller may be configured to perform a routine, such as the example routines of FIGS. 4-5, to rotate the engine, unfueled, during vehicle operation using motor torque, so as to transfer heated generated from compressing air in a compression stroke (FIG. 7) to heat engine combustion chambers while also raising fuel pressure. Additionally, the controller may rotate an electrically-actuated compressor of the engine system to heat the engine via compressor energy. The controller may use various combinations of compression heating, as listed in the table of FIG. 6. An example engine heating operation is shown at FIG. 8. In this way, engine particulate emissions can be reduced, particularly during cold-starts.

FIG. 1 depicts a hybrid propulsion system 100 for a vehicle. In the depicted embodiment, the vehicle is a hybrid electric vehicle (HEV). Propulsion system 100 includes an engine system 5 with an internal combustion engine 10 having a plurality of cylinders 30. Fuel may be provided to each cylinder of engine 10 from a fuel system (not shown) including one or more fuel tanks, one or more fuel pumps, and one or more fuel injectors 66. Fuel injectors 66 may be configured for direct injection, port injection, or a combination of both. A detailed description of an example engine system coupled in hybrid propulsion system 100 is provided at FIG. 2.

Engine 10 delivers power to transmission 44 via torque input shaft 18. In the depicted example, transmission 44 is a power-split transmission (or transaxle) that includes a planetary gearset 22 and one or more rotating gear elements. Transmission 44 further includes an electric generator 24 and an electric motor 26. The electric generator 24 and the electric motor 26 may also be referred to as electric machines as each may operate as either a motor or a generator. Torque is output from transmission 44, for propelling vehicle tractions wheels 52, via a power transfer gearing 34, a torque output shaft 19, and differential-and-axle assembly 36.

Generator 24 is drivably connected to electric motor 26 such that each of electric generator 24 and electric motor 26 may be operated using electric energy from an electrical energy storage device, herein depicted as battery 54. In some embodiments, an energy conversion device, such as an inverter, may be coupled between the battery and the motor to convert the DC output of the battery into an AC output for use by motor. However, in alternate embodiments, the inverter may be configured in the electric motor.

Electric motor 26 may be operated in a regenerative mode, that is, as a generator, to absorb energy from vehicle motion and/or the engine and convert the absorbed kinetic energy to an energy form suitable for storage in battery 54. Furthermore, electric motor 26 may be operated as a motor or generator, as required, to augment or absorb torque provided by the engine.

Planetary gearset 22 comprises a ring gear 42, a sun gear 43, and a planetary carrier assembly 46. The ring gear and sun gear may be coupled to each other via the carrier. A first input side of planetary gearset 22 is coupled to engine 10 while a second input side of the planetary gearset 22 is coupled to the generator 24. An output side of the planetary gearset is coupled to vehicle traction wheels 52 via power transfer gearing 34 including one or more meshing gear elements 60-68. In one example, the meshing gear elements 60-68 may be step ratio gears wherein carrier assembly 46 may distribute torque to the step ratio gears. Gear elements 62, 64, and 66 are mounted on a countershaft 17 with gear element 64 engaging an electric motor-driven gear element 70. Electric motor 26 drives gear element 70, which acts as a torque input for the countershaft gearing. In this way, the planetary carrier 46 (and consequently the engine and generator) may be coupled to the vehicle wheels and the motor via one or more gear elements. Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event.

For example, the vehicle may be driven in an engine mode wherein engine 10 is operated as the primary source of torque for powering wheels 52. During the engine mode, fuel may be supplied to engine 10 from a fuel tank via fuel injector 66 so that the engine can spin fueled to provide the torque for propelling the vehicle. Specifically, engine power is delivered to the ring gear of the planetary gearset. Coincidentally, the generator provides torque to the sun gear 43, producing a reaction torque to the engine. Consequently, torque is output by the planetary carrier to gears 62, 64, 66 on countershaft 17, which in turn delivers the power to wheels 52. Additionally, the engine can be operated to output more torque than is needed for propulsion, in which case the additional power is absorbed by the generator (in generating mode) to charge the battery 54 or supply electrical power for other vehicle loads.

In another example, the vehicle may be driven in an assist mode wherein engine 10 is operated and used as the primary source of torque for powering wheels 52 and the electric motor is used as an additional torque source to act in cooperation with, and supplement the torque provided by, engine 10. During the assist mode, as in the engine mode, fuel is supplied to engine 10 so as to spin the engine fueled and provide torque to the vehicle wheels.

In still another example, the vehicle may be driven in an engine-off or electric mode wherein battery-powered electric motor 26 is operated and used as the only source of torque for driving wheels 52. As such, during the electric mode, no fuel may be injected into engine 10 irrespective of whether the engine is spinning or not, and the vehicle is propelled with motor torque only. The electric mode may be employed, for example, during braking, low speeds, low loads, while stopped at traffic lights, etc. Specifically, motor power is delivered to gear element 70, which in turn drives the gear elements on countershaft 17, and thereon drives wheels 52.

Propulsion system 100 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, etc. The various actuators may include, for example, the gear set, cylinder fuel injectors (not shown), an air intake throttle coupled to the engine intake manifold (not shown), etc. Additional sensors and actuators are elaborated at FIGS. 2-3. Controller 12 may receive input data from the various sensors, process the input data, and trigger the actuators in response to the processed input data based on instruction or code programmed therein corresponding to one or more routines. Example control routines are described herein with regard to FIGS. 4-5.

As such, direct injected engines can generate a large amount of particulate matter (or soot) especially during cold start operations. This is in part due to poor fuel injector spray characteristics at the low fuel pressures of an engine start. In addition, soot is generated due to fuel impacting the cold metal surfaces of the combustion chamber during the start. Soot generation can be substantially reduced by engine heating and fuel pressurization. However, this may be difficult to achieve before an engine start due to the large mass of the engine and the limited time and power available before an engine start. Likewise, engine rotation is required to build fuel pressure since the fuel pump is typically camshaft driven. However, start time requirements may limit the number of engine rotations allowed prior to a first fuel injection, resulting in less than optimum fuel pressures at engine start.

In hybrid vehicle systems, the engine is left off until power to accelerate (in addition to the power provided by the vehicle motor) is required. The inventors herein have recognized that the delay incurred in transitioning from an engine-off mode (e.g., electric mode) to an engine-on mode (e.g., an assist mode) in a hybrid vehicle may be sufficient to opportunistically prepare the engine for the imminent engine restart. In particular, during that time delay, the engine may be turned slowly, such as at a speed lower than the speed at which the engine is rotated during cranking (at an engine restart) via an engine starter motor. The engine may be rotated slowly via the motor (such as motor 26) using energy from a system energy storage device (such as battery 54), including system batteries. Alternatively, the engine may be rotated during vehicle slowing or deceleration events to recover energy that would otherwise be lost via wheel braking.

Figure 7:
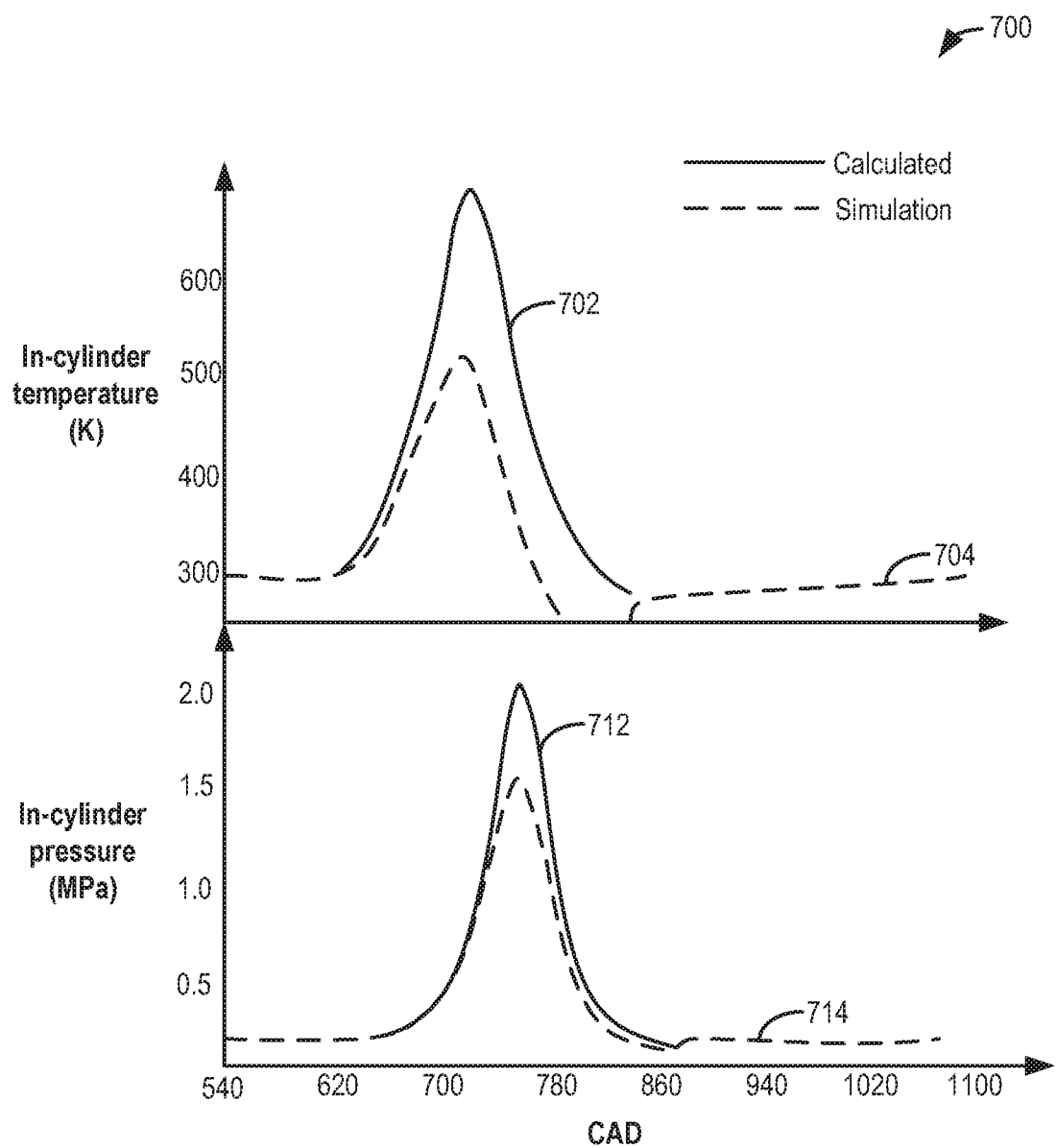
FIG. 7 illustrates an example map of cylinder heating during compression stroke.
Figure 8:
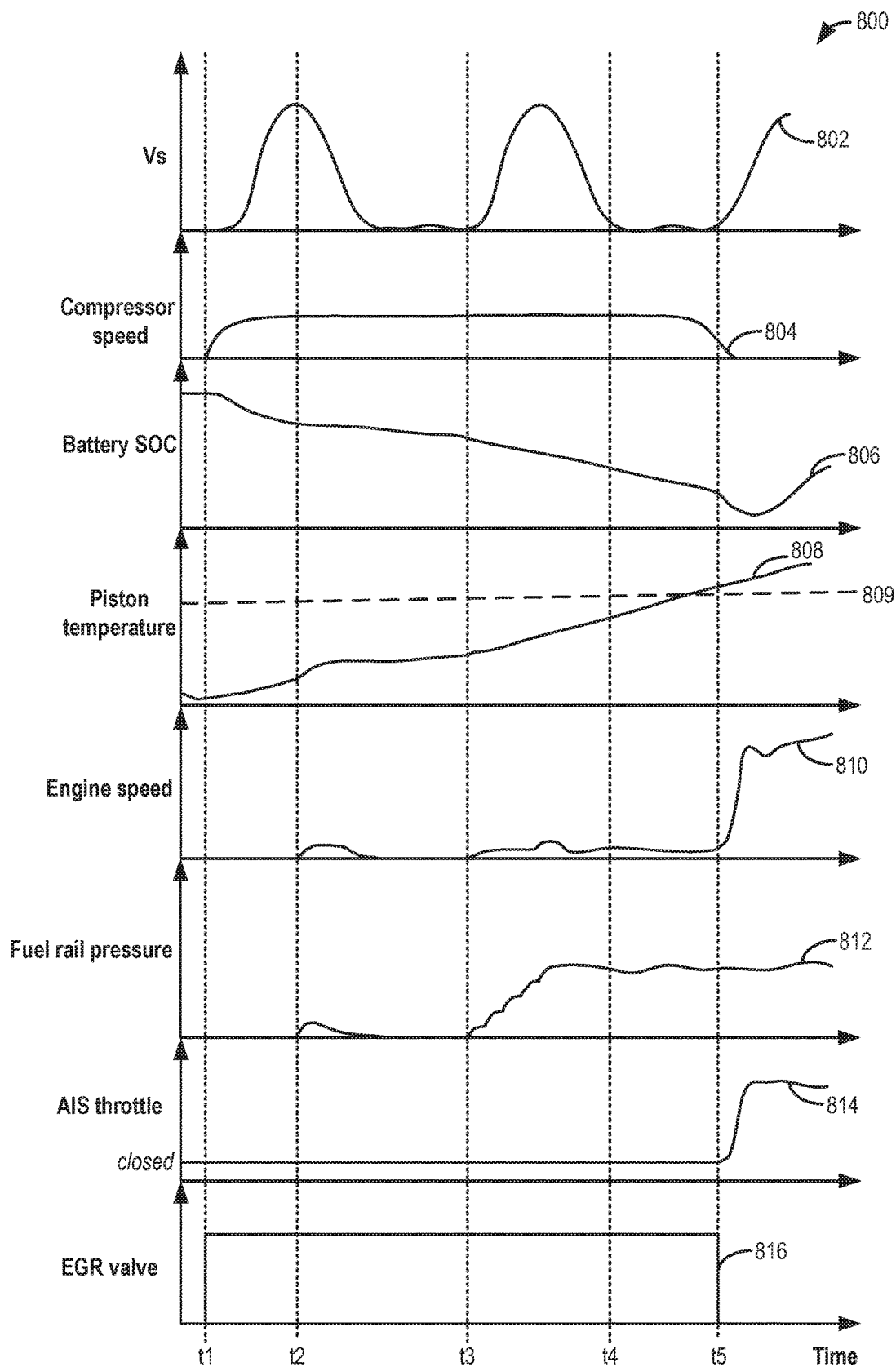
FIG. 8 illustrates an example engine heating operation to reduce particulate matter emissions from a hybrid vehicle system.

The slow rotation may allow each engine cylinder to be sequentially rotated through a cylinder compression stroke, as elaborated at FIG. 7. Consequently, heat generated from air compressed in each cylinder during the respective compression stroke can be effectively transferred to the cylinder walls. As such, this allows the cylinder wall temperature and the cylinder charge temperature is be rapidly equilibrated and the cylinder piston to be warmed. In an alternate example, the engine may be slowly rocked (that is, a direction of rotation may be frequently alternated while rotating the engine slowly) so that each cylinder can go through the compression stroke. In this way, the engine can be slowly rotated so that all cylinders of the engine can be heated before an engine restart. During the subsequent engine restart, when fuel injection is resumed, the fuel impacting the warmer walls of the cylinder may result in lowered soot emissions. In addition, the multiple slow rotations may enable the fuel rail pressure to be sufficiently raised, improving fuel injector spray characteristics.

FIG. 2 schematically shows aspects of an example engine system 200. In one example, engine system 200 may be included in propulsion system 100 of FIG. 1, such as at engine system 5. Engine system 200 includes engine 10. In the depicted embodiment, engine 10 is a boosted engine coupled to a turbocharger 13 including a compressor 114 driven by a turbine 116. Specifically, fresh air is introduced along intake passage 142 into engine 10 via air cleaner 112 and flows to compressor 114. Intake passage 142 may optionally include an intake air heater 118, as shown in the depicted embodiment, for heating intake air delivered to the engine.

In the depicted embodiment, compressor 114 is an electrically-actuated intake-air compressor that can be driven by actuating electric motor 117, such as where the compressor is configured as a motor-driven or driveshaft driven supercharger compressor. In other examples, compressor 114 may be a turbocharger compressor mechanically coupled to turbine 116 via a shaft (not shown), the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

Compressor 114 is coupled, through charge-air cooler (CAC) 18 (herein also referred to as an intercooler) to throttle valve 20. Throttle valve 20 is coupled to engine intake manifold 23. An additional air induction system (AIS)

throttle 230 may also be coupled to the engine intake, upstream of compressor 114, and upstream of intake throttle 20. The pressure of the air charge within the intake manifold is sensed by manifold air pressure (MAP) sensor 124. From the compressor, the compressed air charge flows through the charge-air cooler 117 and the throttle valve to the intake manifold. Since flow through the compressor can heat the compressed air, downstream CAC 117 is provided so that boosted intake aircharge can be cooled prior to delivery to the engine intake. The charge-air cooler may be an air-to-water heat exchanger, for example. As elaborated herein, during selected engine restart conditions, selective compressor operation may be advantageously used to heat the engine.

One or more sensors may be coupled to an inlet of compressor 114. For example, a temperature sensor 55 may be coupled to the inlet for measuring a compressor inlet temperature, and a pressure sensor 56 may be coupled to the inlet for measuring a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when EGR is enabled, the sensors may estimate a temperature, pressure, humidity, and air-fuel ratio of the aircharge mixture including fresh air, recirculated compressed air, and exhaust residuals received at the compressor inlet.

During selected conditions, such as during a tip-out, when going from engine operation with boost to engine operation without boost, compressor surge can occur. This is due to an increased pressure differential being generated across the compressor when the throttle closes at the tip-out. The increased pressure differential reduces forward flow through the compressor, causing surge and degraded turbocharger performance. In addition, surge can lead to NVH issues such as undesirable noise from the engine intake system. To relieve boost pressure and reduce compressor surge, at least a portion of the aircharge compressed by compressor 114 may be recirculated to the compressor inlet. This allows excess boost pressure to be substantially immediately relieved. The compressor recirculation system may include a compressor recirculation passage 170 for recirculating cooled compressed air from the compressor outlet, downstream of charge-air cooler 117 to the compressor inlet. In some embodiments, an additional compressor recirculation passage (not shown) may be provided for recirculating un-cooled (or warm) compressed air from the compressor outlet, upstream of charge-air cooler 117 to the compressor inlet.

A compressor recirculation valve (CRV) 172 may be coupled to compressor recirculation passage 170 (also referred to herein as a compressor bypass) to control an amount of cooled compressor flow recirculated to the compressor inlet. CRV 72 may be configured as an on/off valve whose position is varied between and open and a closed position. Alternatively, CRV 72 may be configured as a continuously variable valve wherein a position of the valve is continuously variable between the fully closed position and the fully open position. CRV 72 may be positioned in passage 170, downstream of CAC 117 and upstream of an inlet of compressor 114. A position of CRV 72 may be adjusted during boosted engine operation to improve peak performance and provide a margin to surge. In one example, the CRV may be maintained closed during boosted engine operation to improve boost response and peak performance. In another example, the CRV may be maintained partially open during boosted engine operation so as to provide some surge margin, in particular, an improved margin to soft surge.

As elaborated herein, compressor recirculation may also be used during conditions when the engine is not combusting. Specifically, during conditions when the engine cylinders are being heated via selective operation of compressor 114, CRV 72 may be held open to increase recirculation of heated charge across the compressor, causing the CAC to be warmed using compressor energy.

Surge may also be relieved by reducing exhaust pressure at turbine 116. For example, a wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge. However, due to the boost dynamics of the wastegate, the effects of compressor recirculation valve adjustments on reducing surge may be faster than the effects of the wastegate adjustments.

Intake manifold 23 is coupled to a series of combustion chambers 30 through a series of intake valves (shown in FIG. 3). The combustion chambers are further coupled to exhaust manifold 25 via a series of exhaust valves (shown in FIG. 3). In the depicted embodiment, a single exhaust manifold 25 is shown. However, in other embodiments, the exhaust manifold may include a plurality of exhaust manifold sections. Configurations having a plurality of exhaust manifold sections may enable effluent from different combustion chambers to be directed to different locations in the engine system.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 2, exhaust from the one or more exhaust manifold sections is directed to turbine 116 to drive the turbine. When reduced turbine torque is desired, some exhaust may be directed instead through wastegate 90, by-passing the turbine. The combined flow from the turbine and the wastegate then flows through emission control device (ECD) 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

As such, one or more of the exhaust catalysts of emission control device 170 may require thermal activation. Specifically, the catalyst may need to be heated to or above a light-off temperature above which the catalyst is catalytically active. While this heat is provided by exhaust gas released from cylinder combustion during engine operation, during an engine restart, the temperature of the catalyst may be below its activation temperature. In some embodiments, to expedite activation of the exhaust catalyst to improve engine start emissions, emission control device 170 may be coupled to an exhaust catalyst heater 121.

All or part of the treated exhaust from emission control device 170 may be released into the atmosphere via exhaust conduit 35. Depending on operating conditions, however, a portion of the exhaust residuals may be diverted instead to EGR passage 150, through EGR cooler 151 and EGR valve 152, to the inlet of compressor 114. As such, EGR passage 150 is configured as a low pressure EGR passage coupling the engine exhaust manifold, downstream of the turbine 116, with the engine intake manifold, upstream of compressor 114. In the depicted example, EGR passage is shown coupled to the compressor inlet independent of the compressor recirculation passage. However, in alternate examples, EGR passage 150 may merge with compressor recirculation passage 170 upstream of the compressor inlet. Also in the depicted example, EGR passage 150 is shown picking up exhaust residuals at a location downstream of emission control device 170. It will be appreciated that in alternate examples, EGR passage 150 may be configured to pick up exhaust residuals at a location upstream of emission control device 170. In still further embodiments, engine system 100 may additionally or optionally include a high pressure EGR system coupling the engine exhaust manifold, upstream of the turbine 116, with the engine intake manifold, downstream of compressor 114.

EGR valve 152 may be opened to admit a controlled amount of cooled exhaust gas to the compressor inlet for desirable combustion and emissions-control performance. In this way, engine system 10 is adapted to provide external, low-pressure (LP) EGR by tapping exhaust gas from downstream of turbine 116. EGR valve 152 may also be as a continuously variable valve or as an on/off valve. The rotation of the compressor, in addition to the relatively long LP-EGR flow path in engine system 10, provides excellent homogenization of the exhaust gas into the intake air charge. Further, the disposition of EGR take-off and mixing points provides very effective cooling of the exhaust gas for increased available EGR mass and improved performance.

EGR cooler 151 may be coupled to EGR passage 150 for cooling EGR delivered to the compressor. In addition, one or more sensors may be coupled to EGR passage 150 for providing details regarding the composition and condition of the EGR. For example, a temperature sensor may be provided for determining a temperature of the EGR, a pressure sensor may be provided for determining a temperature of the EGR, a humidity sensor may be provided for determining a humidity or water content of the EGR, and an air-fuel ratio sensor 154 may be provided for estimating an air-fuel ratio of the EGR. Alternatively, EGR conditions may be inferred by the one or more temperature, pressure, humidity and air-fuel ratio sensors 55-57 coupled to the compressor inlet. An opening of the EGR valve may be adjusted based on the engine operating conditions and the EGR conditions to provide a desired amount of engine dilution.

As elaborated herein, during conditions when the engine is not combusting, the EGR valve may be opened to expedite cylinder warming. Specifically, during conditions when the engine is being slowly rotated by motor torque prior to an engine restart, and/or while the compressor is rotated via its electric motor, EGR valve 152 is held fully open so that aircharge heated in the cylinders during a compression stroke or heated via compressor energy can be recirculated through the engine. By concurrently holding AIS throttle 230 fully closed, flow out of the exhaust is limited, and the hot air is kept in the engine. In other words, the hot air can be pumped in a loop through the engine. By additionally operating one or more of intake heater 118 and exhaust catalyst heater 121, heat transfer to cylinders can be further expedited. As elaborated at FIG. 6, based on the piston heating requirement, the engine system may be operated in one of various modes wherein various combinations of compression heating is used to heat the cylinder. For example, when more heating is required, while rotating the compressor 114 via electric motor 117, CRV 172 may be opened, while also operating intake heater 118 and exhaust catalyst heater 121. Additionally, the engine may be rotated unfueled via motor torque either continuously during the compressor rotation, or intermittently.

Engine system 200 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and EGR sensor 154. Other sensors such as additional pressure, temperature, air/fuel ratio, and composition sensors may be coupled to various locations in engine system 200. The actuators 81 may include, for example, throttle 20, EGR valve 152, compressor recirculation valve 172, wastegate 92, and fuel injector 66. The control system 14 may include a controller 12. The controller may receive input data from the various sensors, process the input data, and trigger various actuators in response to the processed input data based on instruction or code programmed therein corresponding to one or more routines.

FIG. 3 depicts an example embodiment of a combustion chamber or cylinder of engine 10 (of FIGS. 1-2). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 236 with piston 238 positioned therein. Piston 238 may be coupled to crankshaft 240 so that reciprocating motion of the piston is translated into rotational motion of the crankshaft. Crankshaft 240 may be coupled to at least one drive wheel of the passenger vehicle via a transmission system. Further, a starter motor may be coupled to crankshaft 140 via a flywheel to enable a starting operation of engine 10. Specifically, the generator 24 (of FIG. 1) and driveline including motor 26 (of FIG. 1) may be coupled to the crankshaft to provide torque for engine cranking.

Cylinder 30 can receive intake air via a series of intake air passages 242, 244, and 246. Intake air passage 246 can communicate with other cylinders of engine 10 in addition to cylinder 30. In some embodiments, one or more of the intake passages may include a boosting device such as a turbocharger or a supercharger. For example, FIG. 3 shows engine 10 configured with a turbocharger including an electrically-actuated compressor 274 arranged between intake passages 242 and 244, and an exhaust turbine 276 arranged along exhaust passage 248. Compressor 274 may be at least partially powered by exhaust turbine 276 via a shaft 280 where the boosting device is configured as a turbocharger. However, in other examples, such as where engine 10 is provided with a supercharger, exhaust turbine 276 may be optionally omitted, where compressor 274 may be powered by an electric motor. A throttle 20 including a throttle plate 164 may be provided along an intake passage of the engine for varying the flow rate and/or pressure of intake air provided to the engine cylinders. For example, throttle 20 may be disposed downstream of compressor 274 as shown in FIG. 3, or alternatively may be provided upstream of compressor 174. In some embodiments, as elaborated with reference to FIG. 2, a charge air cooler (CAC) may be located downstream of compressor 274 and upstream of throttle 20 for cooling a boosted aircharge delivered to the engine. Alternatively, the CAC can be located downstream of the throttle integrated in the intake manifold 246.

Exhaust passage 248 can receive exhaust gases from other cylinders of engine 10 in addition to cylinder 30. Exhaust gas sensor 128 is shown coupled to exhaust passage 148 upstream of emission control device 170. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 170 may be a three way catalyst (TWC), NOx trap, various other emission control devices, or combinations thereof.

Exhaust temperature may be estimated by one or more temperature sensors (not shown) located in exhaust passage 248. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 250 and at least one exhaust poppet valve 256 located at an upper region of cylinder 30. In some embodiments, each cylinder of engine 10, including cylinder 30, may include at least two intake poppet valves and at least two exhaust poppet valves located at an upper region of the cylinder.

Intake valve 250 may be controlled by controller 12 by cam actuation via cam actuation system 251. Similarly, exhaust valve 256 may be controlled by controller 12 via cam actuation system 253. Cam actuation systems 251 and 253 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 250 and exhaust valve 256 may be determined by valve position sensors 255 and 257, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 238 is at bottom center to top center. Conventionally, the compression ratio is in the range of 9:1 to 13:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 3 shows only one cylinder of a multi-cylinder engine. As such each cylinder may similarly include its own set of intake/exhaust valves, fuel injector(s), spark plug, etc.

Fuel tanks in fuel system 8 may hold fuel with different qualities, such as different compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc.

Further, in the disclosed embodiments, an EGR system may route a desired portion of air charge or exhaust gas from exhaust passage 248 to air induction passage 242. FIG. 3 shows an LP-EGR system wherein LP-EGR is routed through LP-EGR passage 260 from downstream of turbine 276 to upstream of compressor 274. The amount of LP-EGR provided to intake passage 242 may be varied by controller 12 via LP-EGR valve 262. Likewise, there may be an HP-EGR system (not shown) wherein HP-EGR is routed through an HP-EGR passage from upstream of turbine 276 to downstream of compressor 274. The amount of HP-EGR provided to intake passage 146 may be varied by controller 12 via a dedicated HP-EGR valve. The HP-EGR system may include an HP-EGR cooler and the LP-EGR system may include LP-EGR cooler 266 to reject heat from the EGR gases to engine coolant, for example.

EGR sensors may be arranged within EGR passages and may provide an indication of one or more of mass flow, pressure, temperature, concentration of $O_2$, and concentration of the exhaust gas. In some embodiments, one or more sensors may be positioned within LP-EGR passage 260 to provide an indication of one or more of a pressure, temperature, and air-fuel ratio of exhaust gas recirculated through the LP-EGR passage. Exhaust gas diverted through LP-EGR passage 260 may be diluted with fresh intake air at a mixing point located at the junction of LP-EGR passage 260 and intake passage 242. Specifically, by adjusting LP-EGR valve 262 in coordination with a low pressure air-induction system (LP AIS) throttle 230, a dilution of the EGR flow may be adjusted. A percent dilution of the LP-EGR flow may be inferred from the output of a sensor 265 in the EGR gas stream.

Controller 12 is shown in FIG. 3 as a microcomputer, including microprocessor unit 206, input/output ports 208, an electronic storage medium for executable programs and calibration values shown as read only memory chip 210 in this particular example, random access memory 212, keep alive memory 214, and a data bus. Controller 12 may receive various signals from sensors coupled to engine 10, in addition to those signals previously discussed, including measurement of inducted mass air flow (MAF) from mass air flow sensor 222; engine coolant temperature (ECT) from temperature sensor 216 coupled to cooling sleeve 218; a profile ignition pickup signal (PIP) from Hall effect sensor 220 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 210 can be programmed with computer readable data representing instructions executable by processor 206 for performing the methods described below as well as other variants that are anticipated but not specifically listed. Example routines are described herein at FIGS. 4-5.

Figure 4:
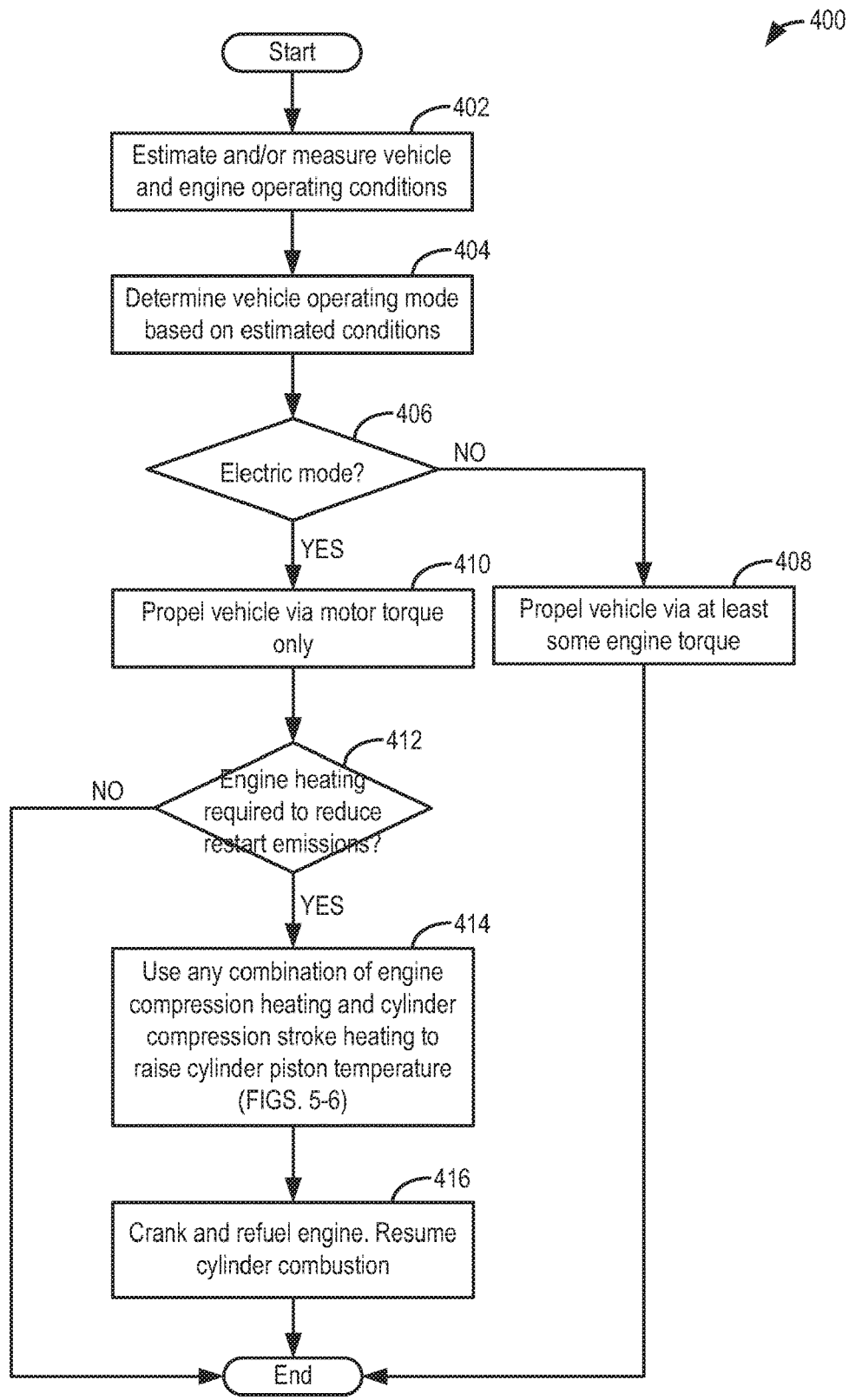
FIG. 4 shows an example method for compression heating engine cylinders before an engine start.

Now turning to FIG. 4, an example routine 400 is shown for compression heating engine cylinders prior to an engine restart. In this way, soot emissions upon direct injection of fuel during the subsequent engine restart can be reduced.

At 402, vehicle and engine operating conditions may be estimated and/or measured. These may include, for example, a brake pedal position, accelerator pedal position, operator torque demand, battery state of charge (SOC), engine temperature (Teng), ambient temperature and humidity, barometric pressure (BP), etc. In one example, the hybrid vehicle system is a power split hybrid vehicle system.

At 404, a vehicle mode of operation may be determined based on the estimated operating conditions. For example, based at least on the estimated driver torque demand and the battery state of charge, it may be determined whether the vehicle is to be operated in an engine-only mode (with the engine driving the vehicle wheels), an assist mode (with the battery assisting the engine in driving the vehicle), or an electric-only mode (with only the battery driving the vehicle). In one example, if the demanded torque can be provided by only the battery, the vehicle may be operated in the electric-only mode with the vehicle being propelled using motor torque only. In another example, if the demanded torque cannot be provided by the battery, the vehicle may be operated in the engine mode, or in the assist mode where the vehicle is propelled with at least some engine torque. The vehicle may accordingly be operated in the determined mode of operation.

At 406, it may be confirmed that the vehicle is in the electric mode. If the electric mode is not confirmed, at 408, the hybrid vehicle may be propelled with at least some engine torque. For example, the vehicle may be propelled with only engine torque (e.g., in the electric mode) or a combination of engine torque and motor torque (e.g., in the assist mode). If the electric mode is confirmed, at 410, the routine includes propelling the hybrid vehicle via only motor torque.

At 412, engine cylinder temperatures may be estimated, inferred, or modeled and it may be determined if engine heating is required to reduce emissions on the subsequent engine restart. In one example, cylinder piston temperatures may be assessed and it may be determined that heating is required if the piston temperature is below a threshold temperature. In another example, cylinder wall temperatures may be compared to a cylinder charge temperature and it may be determined that heating is required if the difference in cylinder wall temperature and cylinder charge temperature is higher than a threshold amount. In still further examples, while propelling the vehicle with motor torque, it may be determined if an engine start is imminent. For example, based on operating conditions such as an operator pedal position, a battery state of charge, etc., it may be determined if the engine will need to be restarted to meet the operator torque demand. If the engine cylinder temperatures indicate that further heating is not required and/or if an imminent engine restart is not confirmed, the routine may end.

If heating is required, at 414, in anticipation of the imminent engine restart, the controller may use any combination of engine compression heating and cylinder compression stroke heating to raise cylinder piston temperatures. As elaborated at FIGS. 5-6, this may include, while propelling the hybrid vehicle via motor torque, rotating an electrically-actuated intake compressor with an upstream intake throttle closed and an EGR valve open until a piston temperature is higher than a threshold (or until a temperature difference between cylinder wall and cylinder charge is below a threshold amount). Herein, compressor energy is used to compress the aircharge which generates heat. That heat is then circulated through the engine, enabling cylinder heating.

Alternatively, the heating may include rotating the engine unfueled via motor torque at lower than an engine cranking speed while operating an exhaust heater or an intake heater and while holding the EGR valve open and the intake throttle closed to recirculate heated aircharge through the engine. As such, during the slow rotation, each cylinder of the engine is gradually rotated to a first position where the cylinder is in a compression stroke, and maintained at the first position transiently so that a temperature of the walls and charge of the cylinder can be equilibrated. The slow rotation allows each cylinder to be likewise rotated to and transiently held in the compression stroke where the cylinder is heated. As such, the cylinder may then get cooled as the cylinder then continues to rotate into the subsequent expansion stroke. However, the cylinder may be heated more in the compression stroke than the cylinder is cooled during the expansion stroke, allowing for a net heating of the cylinder via the slow rotation. In this way, the slow rotation enables a heat pump effect in the cylinder. The slow rotation of the engine may advantageously use heat generated in the compression stroke of the selected cylinders to heat the combustion chamber, and thereby pre-heat the engine before the engine restart. In addition, fuel pressure can be raised via engine slow rotation, which improves fuel spray characteristics, and reduces soot generation.

Still other combinations may be possible, as listed in the table of FIG. 6. In each case, the rotating is initiated in response to the need for cylinder heating (e.g., in response to a cylinder piston temperature being lower than a threshold) and the rotating is continued until the piston temperature is higher than the threshold. By heating the engine before the restart, cold-start particulate matter emissions resulting from direct injection of fuel onto cold combustion chamber surfaces, can be reduced.

At 416, after sufficiently pre-heating, the engine may be cranked and fueled if engine restart conditions are met. Optionally, the engine may be prepositioned via the motor. Specifically, the engine may be spun unfueled to a position from where engine restartability is improved. For example, the engine may be spun so that an engine cylinder is at or near intake valve closing (IVC). This allows the cylinder to be compressed during the engine cranking preceding an engine restart and cylinder firing can occur in less than 180 degrees. In an alternate example, the cylinder may be rotated so that the piston is at or near TDC of fueling and compressed. The cylinder may then be waiting for spark. However, in the latter example, there may be some leak down. Once the engine is prepositioned, the engine may be restarted if required. For example, the engine may be restarted due to an increase in operator torque demand that cannot be met via a motor or battery of the hybrid vehicle system. Alternatively, the engine may be restarted due to a drop in the battery state of charge. Further still, the engine may be restarted to operate an air compressor to meet HVAC needs. Once engine restart conditions are met, the engine may be cranked and fueled so that engine combustion can be restarted.

Figure 5:
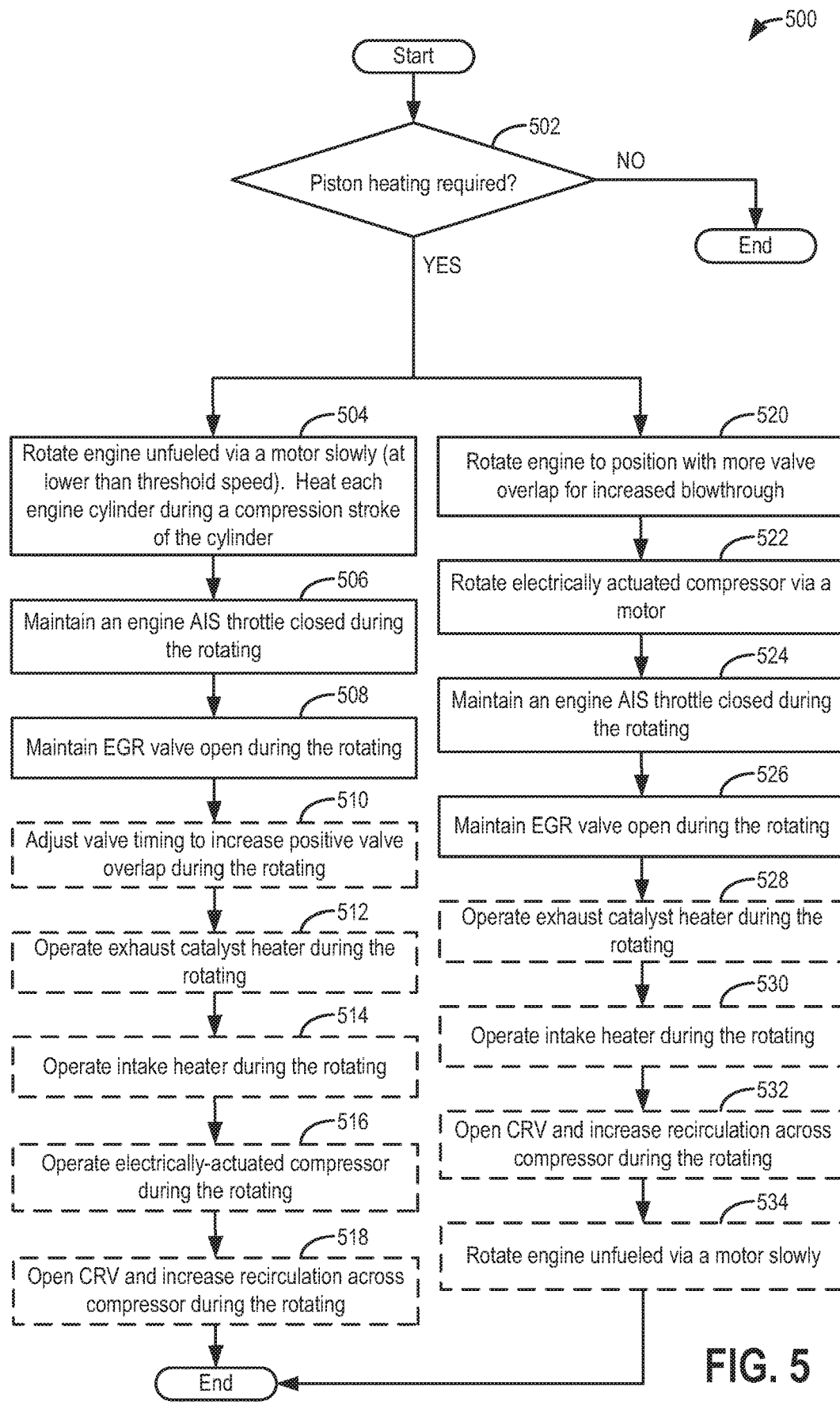
FIG. 5 shows an example method for heating engine cylinders using heat generated during various combinations of engine rotation and compressor rotation.

Now turning to FIG. 5, an example routine 500 is shown for heating engine cylinders using compression heating prior to an engine restart to improve fuel evaporation during the restart.

At 502, it may be confirmed that piston heated is required. In one example, piston heating may be required if the cylinder piston temperature (or an alternate cylinder combustion surface temperature) is below a threshold. In another example, piston heating may be required if a temperature difference between cylinder walls and cylinder charge is below a threshold amount. The cylinder combustion surface temperatures may be estimated, inferred, or modeled. If heating is not required, the routine may end.

If heating is required, the cylinder may be heated via various combinations of compression heating. The various combinations are listed at table 600 of FIG. 6 and some of the options are listed herein at FIG. 5. A first set of heating operations that start with engine rotation are listed at steps 504-518. Another set of heating operations that start with compressor rotation are listed at steps 520-534.

At 504, the routine includes, while propelling the hybrid vehicle via only motor torque and before an imminent engine restart, rotating the engine unfueled via the motor torque at lower than a threshold speed. Herein, the electric motor of the vehicle may be propelling the vehicle and rotating the engine. The threshold speed may be, in one example, an engine cranking speed. That is, the engine may be spun at a speed slower than the speed at which the engine would have been spun by a starter motor during engine crank and restart. For example, during engine cranking, the engine may be rotated unfueled via a starter motor at 150 rpm. In comparison, during the slow rotating for cylinder heating, the engine may be rotated at 10-30 rpm via the electric motor/generator of the hybrid vehicle. In alternate examples, the threshold speed at or below which the engine is slowly rotated may be higher or lower based on operating parameters such as oil temperature, ambient temperature, or NVH.

In one example, slow engine rotating may be initiated in a cylinder (e.g., a first cylinder) selected based on a proximity of a cylinder piston position relative to a compression stroke TDC. For example, a controller may identify a cylinder having a piston positioned closest to compression stroke TDC or at a position where at least a threshold level of compression is experienced. The engine is then rotated so that each cylinder is sequentially heated during a compression stroke of the cylinder. As rotation continues, each cylinder may be cooled during an expansion stroke of the cylinder, immediately following the compression stroke. However, the cylinder may be heated more during the compression stroke than the cylinder is cooled during the expansion stroke allowing for a net heating of each cylinder via a heat pump effect. As such, during a compression stroke of each cylinder, aircharge is compressed, generating heat. By rotating an engine so that a cylinder is held in the compression stroke, heat from the compressed air can be transferred to the cylinder walls, cylinder head, and piston, raising engine temperature.

In some examples, the engine may be opportunistically rotated via vehicle wheels. For example, the controller may determine if there is a decrease in vehicle speed, such as during a vehicle braking or vehicle deceleration event. If so, the engine may be rotated via the wheels during the vehicle braking or vehicle deceleration event. Therein, wheel torque that would have otherwise been dissipated as heat or used for regenerative braking may be advantageously used for engine rotation. The engine rotation via vehicle wheels may be used in place of, or in addition to, the engine rotation via motor torque. For example, during one of the vehicle braking and vehicle deceleration event, the speed of engine rotation may be transiently increased by rotating the engine via the wheels of the hybrid vehicle and the engine motor.

At 506, the routine includes holding an upstream intake throttle (such as AIS throttle 230 of FIGS. 2-3) closed during the rotating. The intake throttle that is closed may be positioned upstream of the intake compressor. Closing the intake throttle allows the compressed aircharge to be pulled back into the engine with no net flow out of the exhaust. As such, this reduces the potential for emissions that could be trapped in the crankcase. At 508, the routine further includes holding an EGR valve (such as EGR valve 152 of FIG. 2) open to recirculate heated aircharge through the engine. By rotating the engine while holding the AIS throttle closed and the EGR valve open, air may be pumped through the engine cylinders. By opening the EGR valve, flow out of the cylinder is recirculated back to the engine, reducing engine vacuum. Herein, air is pumped in a closed circle. By allowing the heat of compression to be removed at TDC upon expansion, the charge is rendered cooler than when the compression started. The charge can then be pushed out of the engine tailpipe or recirculated through the EGR system so that the same charge is used again and again. This limits the potential for hydrocarbons in the exhaust.

At 512, the routine optionally includes, while rotating the engine, operating an exhaust heater coupled to an exhaust catalyst (such as exhaust heater 121 of FIG. 2). At 514, the routine optionally includes, during the rotating, operating an intake heater coupled in an intake passage of the engine (such as intake heater 118 of FIG. 2). By operating one or more of the intake and exhaust heater, additional heat is dumped into the charge that is circulated through the engine cylinders, improving heat transfer to cylinder combustion surfaces.

At 516, the routine optionally further includes, operating an electrically-actuated compressor coupled to an intake of the engine. By rotating the compressor, additional heat is provided via compressor energy into the heated compressed aircharge. While rotating the electrically-actuated compressor, the controller may adjust cam timing (e.g., a VCT position) to increase positive intake to exhaust valve overlap. For example, intake and/or exhaust valve timings may be adjusted to a position where blow-through of the compressed aircharge through the engine cylinders is improved. This improves heat transfer from the compressed aircharge to the engine cylinders.

At 518, the routine optionally further includes, while operating the electrically-actuated compressor, opening a compressor recirculation valve (such as CRV 172 of FIG. 2) coupled across the compressor. By opening the CRV, the CAC may also be warmed via the compressor energy. The engine and/or compressor rotation may then be continued until the cylinders are sufficiently warm.

In an alternate heating option, at 520, the routine includes rotating the engine via the motor to a position with more positive valve overlap for increased blow-through capabilities. For example, cam timing or valve timing may be adjusted to increase positive valve overlap. At 522, the routine includes, while propelling the hybrid vehicle using motor torque, rotating an electrically-actuated intake compressor. Rotating the electrically-actuated intake compressor may include enabling an electric motor coupled to the compressor. In addition, the compressor may be rotated at lower than a threshold speed required for boost build-up. The electric motor coupled to the compressor may be a first electric motor that distinct from a second electric motor (or motor/generator) used to propel the hybrid vehicle.

At 524, while rotating the compressor, an upstream intake throttle may be closed. Specifically, an AIS throttle coupled upstream of the compressor is closed. At 526, an EGR valve is maintained open during the rotating. Closing the intake throttle allows the compressed aircharge to be pulled back into the engine with no net flow out of the exhaust. By opening the EGR valve, flow out of the cylinder is recirculated back to the engine, reducing engine vacuum. By rotating the compressor while holding the AIS throttle closed and the EGR valve open, air may be pumped through the engine cylinders. Thus air is pumped in a closed circle. By allowing the heat of compression to be removed at TDC upon expansion, the charge is rendered cooler than when the compression started. The charge can then be pushed out of the engine tailpipe or recirculated through the EGR system so that the same charge is used again and again. This limits the potential for hydrocarbons in the exhaust. The EGR valve may be positioned in a low pressure EGR passage coupling an engine exhaust, downstream of an exhaust catalyst, to an engine intake, upstream of the compressor.

At 528, the routine optionally includes, during the rotating, enabling an electric heater coupled to an exhaust catalyst. At 530, the routine optionally includes, during the rotating, operating an electric heater coupled in an intake passage of the engine. By operating one or more of the intake and exhaust heaters, the aircharge looped through the engine can be warmed further.

At 532, the routine optionally includes, while rotating the compressor, opening a compressor recirculation valve coupled in a compressor bypass passage across the compressor to increase recirculation through a charge air cooler coupled downstream of the compressor.

At 534, the routine optionally includes, while rotating the compressor, further rotating the engine unfueled via motor torque. For example, the engine may be rotated via motor torque from the second electric motor at less than engine cranking speed. By rotating the engine, each engine cylinder is exposed to the hot blow-through air from the compressor. The engine may be rotated at the reduced speed continuously or intermittently. For example, the engine may be rotated periodically to distribute the compressor heat.

In each case, the rotating is in response to an estimated cylinder piston being lower than a threshold temperature. Further, in each case, the rotating may be continued until the engine cylinder is sufficiently heated. For example, it may be determined if a piston temperature is higher than a threshold, or if a temperature difference between cylinder walls and cylinder charge is lower than a threshold amount. In an alternate example, the engine temperature or an average cylinder piston temperature may be assessed (e.g., compared to a threshold temperature). If the piston temperature is higher than the threshold, or if the difference is lower than the threshold amount, the compressor and/or engine rotation may be discontinued and cylinder fuel injection may be resumed to restart the engine. Else, the engine and/or compressor rotation may be continued until the piston temperature is at or above the threshold temperature (or until the temperature difference between cylinder walls and cylinder charge is lower than the threshold amount, or until the engine temperature or average cylinder piston temperature is higher than the threshold temperature).

In some examples, the controller may also determine if an engine fuel rail pressure is higher than a threshold pressure. Engine rotation may then be adjusted based on the fuel rail pressure estimate. Specifically, if the fuel rail pressure is not sufficiently high, the controller may maintain the un-fueled engine rotation at slower than the threshold speed until the fuel rail pressure is above the threshold pressure. However, since fuel rail pressure can build within a number (e.g., five to ten) pump strokes of the engine, and since a threshold number of pump stroke (e.g., two) are achieved on each engine revolution, the fuel rail pressure may reach the threshold pressure by the time the cylinder temperature is sufficiently raised.

After all the engine cylinders have been warmed, if restart conditions are met, cylinder fuel injection can be resumed to restart the engine. For example, the engine may be rotated at the engine cranking speed via a starter motor of the engine. The controller may then select an engine cylinder in which to resume cylinder fueling. The cylinder may be selected based on a piston position. For example, a cylinder that is at or close to IVC may be selected. Fuel may then be injected into the selected cylinder during engine cranking to restart the engine. It will be appreciated that in an alternate example, the engine may not select an engine cylinder to resume cylinder fueling but may resume fueling as and when required.

It will be appreciated that in still further examples, after slowly rotating the engine for cylinder heating, the routine may include further rotating the engine unfueled via the vehicle motor to a position that is optimal for engine restartability. For example, the engine may be rotated to a position from where the engine can be rapidly restarted if engine restart conditions are not met immediately after the cylinder has been warmed. In one example, the further rotating may include rotating to a position where an engine cylinder is at or near IVC.

In this way, a hybrid vehicle method is provided for heating engine cylinders in response to a cylinder wall temperature being less than a threshold while the vehicle is propelled via motor torque only. Therein, during a first condition, a controller with computer readable instructions stored on non-transitory memory is configured with code for rotating the engine unfueled via the motor torque at less than cranking speed to sequentially heat all engine cylinders as they pass through a compression stroke. In comparison, during a second condition, the controller is configured with code for rotating an electrically-actuated intake compressor with a compressor recirculation valve held open. During both the first and second conditions, an intake throttle is held closed and an EGR valve is held open. In addition, during both the first and second conditions, the rotating is continued until the cylinder wall temperature is above the threshold, the threshold based on cylinder charge temperature. Further, during any of the first and second conditions, one or more of an exhaust heater and an intake heater may be operated, the exhaust heater coupled to an exhaust catalyst positioned upstream of an EGR passage inlet, the intake heater coupled to an intake passage upstream of the compressor.

FIG. 7 graphically depicts the compression stroke heating effect at map 700. In particular, a first set of plots 702-704 are shown depicting the change in an in-cylinder temperature as the cylinder is rotated through compression stroke. A second set of plots 712-714 depict the change in an in-cylinder pressure as the cylinder is rotated through the compression stroke. In the depicted example, the engine is rotated slowly at 30 rpm. In each set, plots 702 and 712 (solid lines) show the calculated data while plots 704 and 714 (dashed lines) show the simulated data. The calculated data represents a scenario where no heat flows and no heat is transferred to the cylinder walls and the piston. In comparison, the simulated data represents a scenario where heat flows and heat is transferred to the cylinder walls and the piston. The plotted ideal curves start at intake valve closing (IVC; at around 625CAD) and end at exhaust valve opening (EVO; at around 832CAD). The calculated curves (plots 704, 714) were based on the isentropic process and volume ratio. The ideal curves (plots 702, 712) are then recalculated with P1 and V1 of the isentropic process and volume ratio at IVC. As can be seen, significant amounts of heat are transferred to the cylinder walls and pistons during the compression stroke, even though some cooling occurs after the compression stroke. In particular, the simulated data shows how heat is lost from the compressed air as it flows to the cylinder walls and pistons with a consequent drop in in-cylinder temperature. Furthermore, the heat is transferred directly to the location where the heat transfer has significant effect on PM emissions. This heat transfer is used to advantageously raise piston temperature. In particular, the compression stroke heating is repeated over multiple cycles until the piston temperature is above a threshold temperature. Therefore, during the slow engine rotation, each cylinder is allowed to be heated during the cylinder's compression stroke. Consequently, when the engine is restarted and fuel is delivered to the pre-heated cylinder, the liquid fuel droplets may directly impinge on hot combustion surfaces, leading to improved fuel evaporation.

Now turning to FIG. 6, table 600 depicts various engine operating or heating modes that may be possible in the hybrid vehicle system of FIGS. 1-3. As such, the depicted modes may be non-limiting examples, and still further modes may be possible.

In one example, the engine system may be operated in a first mode (mode1), wherein the engine is rotated slowly, unfueled via motor torque while an intake throttle is held closed and an EGR valve is held open. Herein, the engine cylinders are heated using heat generated in the compression stroke.

In another example, engine system may be operated in a second mode (mode 2), wherein in addition to all the settings of the first mode, an electric intake heater may be operated for additional charge heating. Alternatively, engine system may be operated in a third mode (mode 3), wherein in addition to all the settings of the first mode, an electric exhaust catalyst heater may be operated for additional charge heating. Further still, engine system may be operated in a fourth mode (mode 4), wherein in addition to all the settings of the first mode, both the intake heater and the exhaust catalyst heater may be operated for additional charge heating.

In a further example, engine system may be operated in a fifth mode (mode 5), wherein in addition to all the settings of the first mode, an electrically actuated compressor may be operated. That is, each of the engine and compressor may be rotated in the fifth mode (and modes related to the fifth mode). In addition, during the fifth mode, valve timing may be adjusted so that the engine operates with valve overlap. By adjusting cam timing to increase positive intake to exhaust valve overlap, improved blow-through of the air (that is compressed and heated by the compressor) through the engine cylinders is provided. During a sixth mode (mode 6), the engine may operate with all the settings of the fifth mode and with a compressor recirculation valve (CRV) open to increase recirculation of the heated charge across the compressor. This enables a downstream CAC to be heated with compressor energy.

The engine may alternatively be operated in a seventh mode (mode 7) wherein in addition to all the settings of the fifth mode, the electric intake heater may be operated for additional charge heating. In the eighth mode (mode 8), the engine may be operated with all the settings of the seventh mode and with the CRV additionally open. The engine may alternatively be operated in a ninth mode (mode 9) wherein in addition to all the settings of the fifth mode, the exhaust catalyst heater may be operated for additional charge heating. In the tenth mode (mode 10), the engine may be operated with all the settings of the ninth mode and with the CRV additionally open.

The engine may also be operated in an eleventh mode (mode 11) wherein each of the engine and compressor is rotated, each of the intake and exhaust heater is operated, each of the CRV and EGR valves are held open while the intake throttle is held closed, and wherein the engine cam timing is adjusted to enable blow-through.

The engine may also be operated in a twelfth mode (mode 12) wherein piston heating is provided by rotating only the compressor. Herein, positive valve overlap is maintained while the intake throttle is closed and the EGR valve is opened. Alternatively, the engine system may be operated in a thirteenth mode (mode 13), wherein in addition to all the settings of the twelfth mode, the CRV may be opened. The engine may also be operated in a fourteenth mode (mode 14), where in addition to rotating the compressor as per the setting of the twelfth mode, the CRV may be held open and the intake heater may be operated, or in a seventeenth mode (mode 17), wherein in addition to rotating the compressor as per the setting of the twelfth mode, the CRV may be held closed and the intake heater may be operated. Likewise, the engine may be operated in a fifteenth mode (mode 15), where in addition to rotating the compressor as per the setting of the twelfth mode, the CRV may be held open and the exhaust heater may be operated, or in an eighteenth mode (mode 18), wherein in addition to rotating the compressor as per the setting of the twelfth mode, the CRV may be held closed and the exhaust heater may be operated. The engine may also be operated in a sixteenth mode (mode 16), wherein in addition to all the settings of the twelfth mode, while rotating the compressor, both the intake heater and the exhaust catalyst heater may be operated for additional charge heating and the CRV may be held open. Finally, the engine may also be operated in a twentieth mode (mode 20) wherein, while rotating the compressor, both the intake heater and the exhaust catalyst heater may be operated and the CRV may be held closed.

While the above depicted modes show the intake throttle as being closed and the EGR valve as being open during the engine and/or compressor rotation, in still further modes, the intake throttle may be open and/or the EGR valve may be closed.

A controller may select between the various modes based on how much cylinder heating is required. The selection may be further based on factors such as battery state of charge (e.g., how long the motor can operate), a time till an imminent engine restart, vehicle speed, etc. Likewise, the controller may transition between modes as the heating requirement changes. For example, when piston temperatures are colder, the controller may initiate operation in one of modes 5-11 wherein both the engine and the compressor is rotated. As the heating demand drops, the controller may transition to operating with either only the engine rotating (as in modes 1-4) or with only the compressor rotating (as in modes 12-20). In an alternate example, when piston temperatures are colder, the controller may initiate operation in one of modes wherein both the intake heater and the exhaust heater are operated. As the heating demand drops, the controller may transition to operating with only one of the intake heater and the exhaust heater enabled.

An example of engine cylinder heating via combinations of engine rotation, compressor rotation, compressor recirculation and exhaust gas recirculation is now shown at map 800 of FIG. 8. Map 800 depicts vehicle speed at plot 802, compressor rotation speed at plot 804, battery state of charge (SOC) at plot 806, cylinder piston temperature at plot 808, engine speed at plot 810, fuel rail pressure at plot 812, AIS intake throttle position at plot 814 and EGR valve position at 816. All plots are shown over time along the x-axis.

Vehicle propulsion may be started at t1. At the time of vehicle propulsion, engine start conditions may not be met and the vehicle may be propelled via motor torque only. For example, the vehicle may be a hybrid vehicle being operated in an electric mode. Between t1 and t2, as operator demand and correspondingly vehicle speed vary, the battery SOC may vary with the battery SOC being reduced at a higher rate when the vehicle speed increases. As such, while the vehicle is propelled using motor torque between t1 and t2, the piston temperature may be below threshold temperature 809.

To enable cylinder heating, to thereby reduce PM emissions and improve engine performance when the engine is subsequently operated, an intake compressor may be rotated while holding an intake throttle positioned upstream of the compressor closed and while opening an EGR valve. In addition, the engine may be positioned for increased blow-through of the warm compressed air. As the compressor is rotated, the piston temperature gradually increases.

After t2, operator torque demand and vehicle speed reduce. As a result, the battery SOC may gradually decrease (at a slower rate) as only compressor rotating via battery power continues. Shortly after t2, a vehicle deceleration event occurs. During this event, instead of dissipating the wheel torque as heat, the engine is opportunistically rotated, unfueled, via the wheels. Based on the drop in wheel torque occurring during the vehicle deceleration event, at least some of the wheel torque is applied to engine rotation via a motor/generator of the vehicle with a transient increase in the speed of engine rotation. As the engine is slowly rotated via the motor, two effects occur. First, the piston temperature is further increased. Second, the fuel rail pressure is raised. Once the vehicle speed drops, the opportunistic engine rotation is stopped. The fuel rail pressure may then gradually dissipate.

At t3, the vehicle speed increases again but engine restart conditions are not met. In addition, an engine restart is not desired since piston temperature, while warmer than the piston temperature at t1, is still lower than threshold 809. Consequently, a large amount of PM emissions may be generated when fuel is direct injected into the cold cylinder. Thus, the engine restart is delayed and the vehicle continues to be propelled with motor torque only.

To expedite the cylinder heating, at t3, while rotating the compressor, the engine may also be rotated, unfueled, at less than engine cranking speed. As such, the compressor and the engine may be rotated via distinct motors, the engine rotated via the same motor propelling the vehicle while the compressor rotated via a dedicated electric motor. The engine may be rotated at 10-30 rpm, for example. As the engine is slowly rotated via the motor between t2 and t3, the piston temperature is further increased. In addition, the fuel rail pressure is raised and held at the elevated level.

Between t3 and t4, another vehicle deceleration event occurs. During this event, instead of dissipating the wheel torque as heat, the engine is opportunistically rotated faster, unfueled, via the wheels. Based on the drop in wheel torque occurring during the vehicle deceleration event, at least some of the wheel torque is applied to engine rotation via the motor/generator of the vehicle with a transient increase in the speed of engine rotation (above the speed at which the engine was being rotated at t2).

Between t4 and t5, due to the combined effect of the compressor rotation and the engine rotation, the piston temperature rises above threshold temperature 809. Thus, the engine cylinders may be considered ready for fueling when restart conditions are met. In response to the rise in piston temperature, compressor rotation is disabled and the compressor spins down to rest. In addition, the EGR valve may be closed. At t5, the vehicle speed increases again and engine restart conditions are considered met. In particular, since the piston is sufficiently warm, and further since the battery SOC is lower, an engine restart is enabled. Accordingly, after t5, the engine is cranked faster via a starter motor and cylinder fueling is resumed. Engine speed then increases as the vehicle is propelled with at least engine torque. In addition, engine torque may be used to charge the battery. In response to the engine restart, the intake throttle is opened, the opening is then adjusted based on engine speed-load conditions.

It will be appreciated that the example of FIG. 8 is a non-limiting example and that still further variations and combinations of compressor rotation, engine rotation, EGR valve position, throttle position, CRV position, intake heater operation, exhaust heater operation, and valve timing may be possible based on the heating requirement.

In this way, an engine of a hybrid vehicle may be slowly cranked using a motor during a transition from operating in an electric mode to an engine mode to heat the engine before an engine start. By slowly spinning the engine, unfueled, for a duration before an imminent engine restart, heat generated from air compressed in a cylinder during a compression stroke can be transferred to cylinder walls and pistons, and advantageously used to heat the engine. Alternatively, by rotating an intake compressor via its electric motor, heat rejected from the compressed air can be blown through the engine and used to heat the cylinders. By heating the cylinders with the intake throttle closed and the EGR valve open, the hot air can be pumped in a loop through the engine, improving heat transfer efficiency. By also opening a compressor recirculation valve, compressor energy can be used to warm a charge air cooler. By rotating both the engine and the compressor concurrently, aircharge heated by the compressor can be recirculated through the engine cylinders, and heat may be distributed to all engine cylinders, allowing for uniform cylinder warming. By warming the engine before an engine start, engine particulate matter emissions resulting from direct injected fuel can be reduced, particularly during an engine cold-start. In addition, fuel pressure can be sufficiently raised. The resulting improvement in fuel injector spray characteristics during the restart further reduces engine particulate matter emissions. Overall, engine cold-start exhaust emissions and engine performance can be improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   while propelling a hybrid vehicle via motor torque, rotating an electrically-actuated intake compressor with an upstream intake throttle closed and an exhaust gas recirculation (EGR) valve open until a piston temperature is above a threshold.

2. The method of claim 1, wherein rotating the electrically-actuated intake compressor includes enabling an electric motor coupled to the compressor and rotating the compressor at lower than a threshold speed.

3. The method of claim 1, further comprising operating an electric heater coupled in an intake passage of an engine during the rotating.

4. The method of claim 1, wherein the EGR valve is positioned in a low pressure EGR passage coupling an engine exhaust, downstream of an exhaust catalyst, to an engine intake, upstream of the compressor, the method further comprising, during the rotating, enabling an electric heater coupled to the exhaust catalyst.

5. The method of claim 2, further comprising, while rotating the compressor, further rotating an engine unfueled via motor torque.

6. The method of claim 5, wherein the electric motor coupled to the compressor is a first electric motor, and wherein propelling the hybrid vehicle via motor torque includes propelling the hybrid vehicle using torque from a second electric motor.

7. The method of claim 6, wherein rotating the engine unfueled includes, while the compressor is rotated, rotating the engine via the second electric motor at less than engine cranking speed continuously.

8. The method of claim 6, wherein rotating the engine unfueled includes, while the compressor is rotated, rotating the engine via the second electric motor at less than engine cranking speed intermittently.

9. The method of claim 1, further comprising, during the rotating, adjusting valve timing to increase positive valve overlap.

10. The method of claim 1, wherein the rotating is in response to an estimated cylinder piston temperature being lower than the threshold.

11. The method of claim 1, further comprising, while rotating the compressor, opening a compressor recirculation valve coupled in a compressor bypass passage across the compressor to increase recirculation through a charge air cooler coupled downstream of the compressor.

12. The method of claim 1, further comprising, after the piston temperature is higher than the threshold, resuming cylinder fuel injection to restart an engine.

\* \* \* \* \*